UNITED STATES PATENT OFFICE.

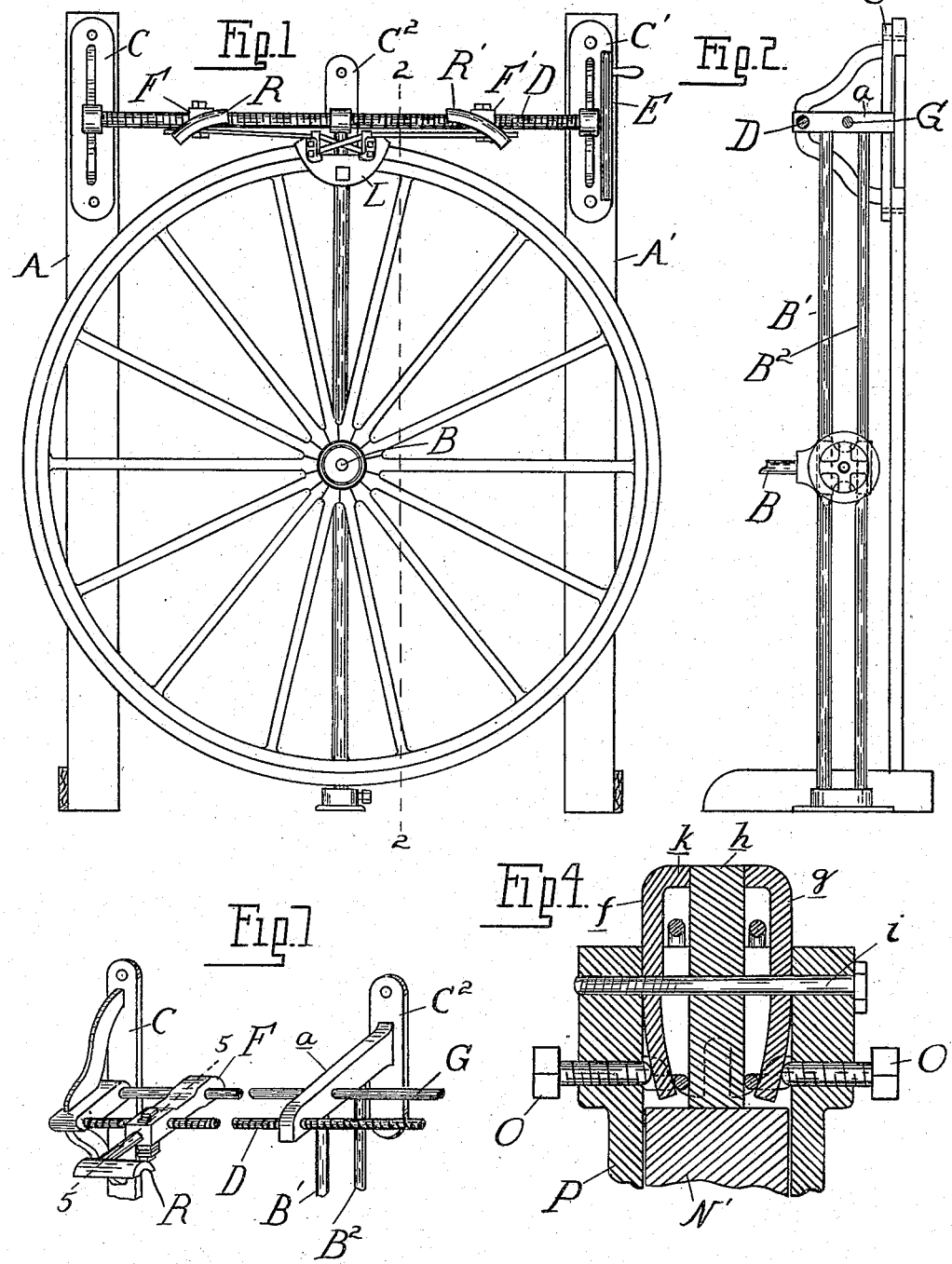

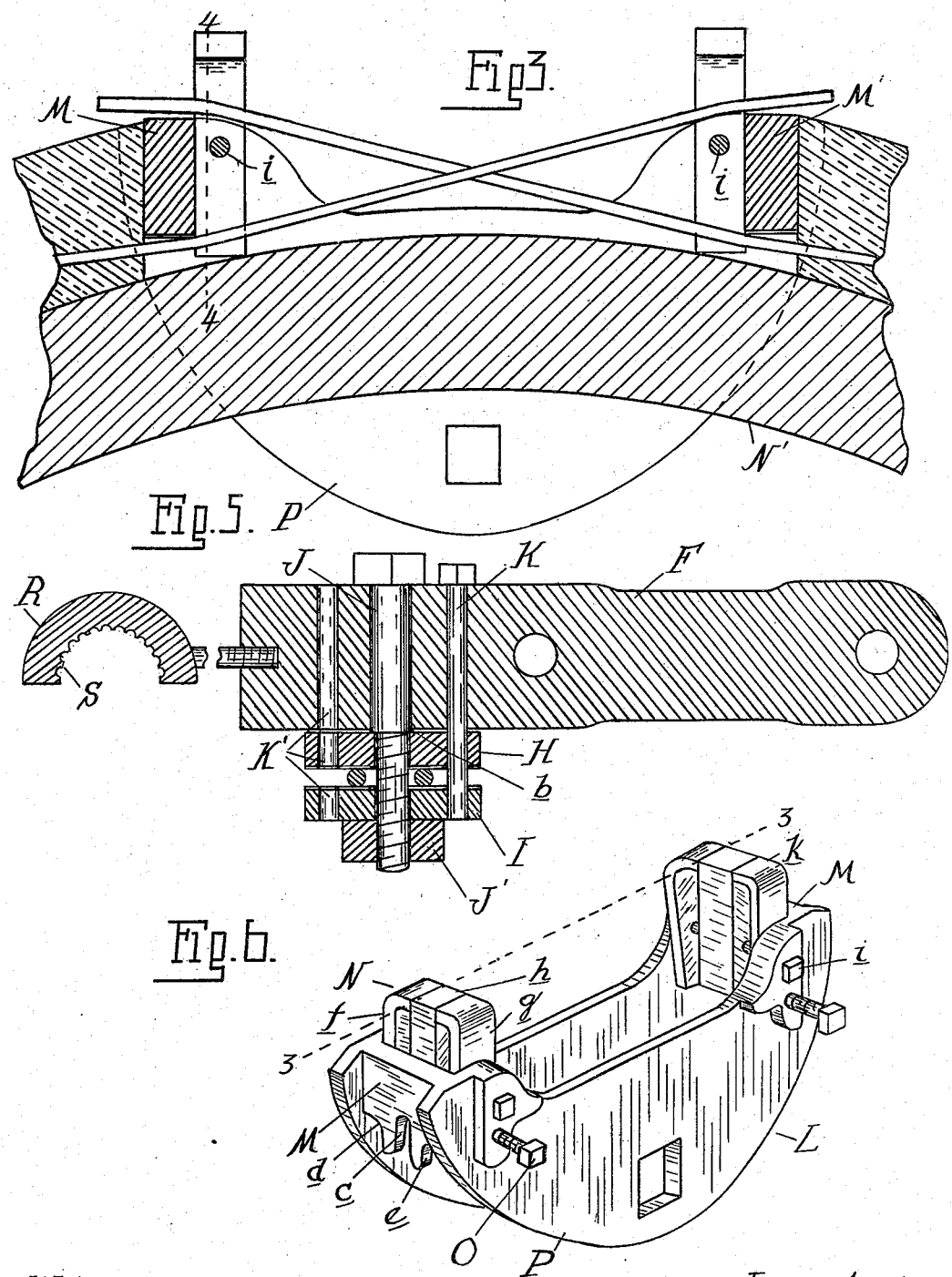

HENRY L. STOUP, OF YPSILANTI, MICHIGAN.

MACHINE FOR ATTACHING TIRES TO WHEELS.

No. 930,502.  Specification of Letters Patent.  Patented Aug. 10, 1909.

Application filed September 14, 1907. Serial No. 392,944.

*To all whom it may concern:*

Be it known that I, HENRY L. STOUP, a citizen of the United States of America, residing at Ypsilanti, in the county of Washtenaw and State of Michigan, have invented certain new and useful Improvements in Machines for Attaching Tires to Wheels, of which the following is a specification, reference being had therein to the accompanying drawings.

The invention relates to machines for attaching rubber tires to vehicle wheels, being more particularly designed for use in the attachment of tires to large sized wheels, but capable of employment for other purposes.

Vehicle tires of the kind for which my machine is designed to be employed are provided with one or more securing wires or bands embedded in the rubber and the tire is held to the wheel rim or felly by properly tensioning and securing together the ends of these wires. The ends of the securing wires are attached to each other in various ways, but for large sized wheels it is usual to bevel off the overlapping portions of these wires and secure them together after tensioning by brazing so as to produce a continuous ring of substantially equal cross section. During the operation of the beveling and brazing, the ends of the rubber tire must be held apart, and after the completion of the attachment of the metal wires these spaced ends of the rubber are forced together.

It is one of the objects of the present invention to increase the working capacity of the machine by providing means whereby the beveling and brazing operations may be performed after the removal of the wheel from the machine, which latter is first employed for placing the wires under proper tension.

It is a further object of the invention to provide means for placing a uniform tension on all of the securing wires where there is a plurality of such wires in a single tire.

With these objects in view the invention consists in certain novel features of construction as hereinafter set forth.

In the drawings—Figure 1 is a front elevation of the machine illustrating the operation of tensioning the wires of a tire; Fig. 2 is a section on line 2—2, of Fig. 1, looking to the left showing the means for adjustably supporting the wheel, the remaining parts being omitted; Fig. 3 is a sectional view on line 3—3, of Fig. 6, showing the device in operative relation to the wheel; Fig. 4 is a cross section on line 4—4, of Fig. 3; Fig. 5 is an enlarged section on line 5—5, of Fig. 7; Fig. 6 is a perspective view of the shield; Fig. 7 is a perspective view of one of the end brackets and the intermediate bracket showing the relation of the guide rod to the shaft.

A, A', is a suitable framework provided with a vertically adjustable spindle B for supporting the hub of the wheel, B' and B² are guide rods for the spindle B, and C C' are brackets secured to the upper portion of the frame in which is journaled a rotary shaft D, having right and left threaded portions upon opposite sides of the center thereof.

C² is an intermediate bracket having a laterally-extending arm $a$ to which are secured the guide rods B' B².

E is a hand-wheel for rotating the shaft, and F F' are members engaging the oppositely threaded portions of the shaft and moved by the rotation thereof toward or from each other.

G is a guide rod for the members F F' adjacent to and parallel with the shaft D and secured to the brackets C, C'.

Each of the members F F' is provided with a wire-engaging clamp and preferably one capable of engaging a plurality of wires. As shown, each of these clamps comprises a pair of gripping jaws, H and I, and a clamping bolt J for drawing them together. These jaws are arranged transversely in relation to the shaft D and members F F' thereon, and are adapted to engage with wires on each side of the clamping bolt. One of the clamps is swiveled to equalize the tension upon the two wires, while the other clamp is held from rotation, and to provide for the swiveled connection a shoulder $b$ is formed on the bolt J. Where the machine is used for a tire secured to the rim by a single wire, the swiveled clamp may be locked from rotation by suitable means, such as pins K, inserted through registering apertures K' in the jaws H and I and member F.

In the operation of tensioning the wire or wires, to secure the tire to the wheel felly, the ends of the rubber must be held apart and this has been accomplished with certain constructions of machines heretofore used by members permanently attached to the machine. Furthermore, with these constructions, it has been necessary to secure the ends of the tensioned wires together before disengagement from the machine, as the operation of filing and brazing the wires is one taking considerable time for its performance, the capacity of the machine is necessarily limited thereby. With the present construction, the wires are held apart by a member detachable from the machine, and this same member is employed for temporarily clamping the wires while under tension, so that the whole wheel may be removed from the machine for the fitting and brazing operation. This permits of using the machine for tensioning the securing wires of the tires, while the operation on the first is being completed.

As shown, L is a member for engaging the wheel felly, which is provided with separated abutments M and M' for the opposite ends of the rubber tire, sufficient space being left between these abutments for attaching the ends of the securing wires to each other. Each of these abutments M is preferably grooved on its under side for engagement with the securing wire of the tire, and preferably provided with a central groove $c$ and a pair of grooves $d$ and $e$ upon opposite sides thereof. The groove $c$ is used where there is but a single securing wire in the tire, and the spaced grooves $d$ and $e$ where there are double wires. Adjacent to each of the abutments M M' is a wire clamp N. This preferably comprises the jaw members $f$ and $g$ and an intervening member $h$. Pins $i$ pass loosely through apertures in said members and secure the clamp N to the member L. At their upper ends, the members $f$ and $g$ are permanently spaced a fixed distance apart from the member $h$—as by the lugs $k$ formed integral with the upper ends of the members $f$ and $g$. The lower ends of these jaw members are adjustable toward or from each other, and are operated by set screws O passing through threaded apertures in the member L. Thus by tightening the set screws, the wire or wires may be clamped between the jaw member or members and the member $h$, as shown in Fig. 4. The member L is preferably provided with downwardly-extending sides P, which embrace the wheel felly N' and protect it from injury during the operation of fitting and brazing together the ends of the wires.

With the construction as described in operation, the frame and the bracket C² are preferably secured to the wall of the building and the wheel to be tired is first placed upon the spindle B, which latter is adjusted to the proper height on the rods B' B² to bring the upper portion of the wheel rim in proper relation to the members F F'. The tire, with its securing wires, is then looped about the wheel felly and the member L is placed between the ends of the rubber, while the securing wires pass through the grooves $c$, or $d$ and $e$, and cross each other in the space between the abutments M and M'. The ends of the cross wires are then secured to the clamps between the jaws H and I, which are pressed together by the bolt H. The operator then turns the hand-wheel E to separate the members F and F' from each other, thereby drawing out the slack in the tire, which in the first place hangs beneath the lower portion of the wheel or felly, and continuing the operation until the tire is drawn closely to the felly and the wires placed under proper tension. During the operation, the rubber upon the wires will be forced back and compressed by the spaced abutments M and M'. The securing wires in passing across the space between the abutments also pass into engagement with the clamps N which engage therewith at a point immediately adjacent to the abutment. After crossing each other, the wires pass between the upper ends of the opposite clamp N at the point where the jaws are held permanently spaced from each other. When the wires are placed under proper tension, the clamps N are tightened by the set screws O, after which the portion of the securing wires extending beyond the member L may be clipped off and the wheel removed from the machine. It will be observed that the portions of the wires which overlap each other are between the clamps N and free to be moved during the operation of the fitting and brazing, which may be performed at any suitable point and in any suitable way. After the wires are brazed together, the clamps N are released which permits of removing the member L. It is, however, necessary to force the separated ends of the rubber tire together, and this is preferably accomplished by replacing the wheel on the spindle B and raising the spindle until the tire engages the shoes R R' carried by the members F F'. These shoes have a roughened inner face S curved so as to fit the contour of the tire, and by turning the hand-wheel E the ends of the tire are forced together.

What I claim as my invention is:

1. In a tire-attaching machine, the combination with means for tensioning the securing wires of a tire about a wheel felly, of a member removable from said machine engaging the sides of the felly, and adapted to protect the same during brazing, and clamping means on said member for securing the ends of the tension wire.

2. In a machine for attaching tires to wheel fellies, the combination with means for tensioning the securing wire of a tire about the wheel felly, of a member removable from the machine engaging the sides of said felly, and adapted to protect the same during brazing, abutments on said member for holding the ends of the rubber portion of the tire apart, and adjacent clamping means for holding the tire-securing wire under tension.

3. A machine for attaching tires to wheel fellies comprising a frame, a wheel supporting spindle vertically adjustably secured to said frame, a transversely-extending rotary shaft having right and left threaded portions upon opposite sides of its center, wire clamping jaws for engagement with said oppositely threaded portions, a member removable from the machine engaging the felly, abutments on said member for holding the ends of the rubber portion of the tire apart, and clamping means carried by said member for holding the tire securing wire under tension.

4. In a tire machine, the combination with means for tensioning the securing wires of a tire about a wheel felly, of a member for engaging the wheel felly removable with said tire and felly from said machine for the purpose of brazing the ends of said wire together, clamping means on said member for securing the ends of the tensioned wire, and means for protecting the felly during the brazing together of the wires.

5. In a tire machine, the combination with means for tensioning the securing wires of a tire about a wheel felly, of a member removable with said tire and felly from said machine, said member being bifurcated to embrace the felly of the wheel, separated abutments on said member extending across the periphery of said felly for engagement with the ends of the rubber portion of the tire, said member being cut away intermediate said abutments, and having downwardly extending sides for protecting the felly during brazing, and clamping means for the tire securing wires carried by said member.

6. As a means for attaching tires to wheel fellies, a member having separated abutments for the ends of the rubber tire, and having portions engaging the sides of the felly and adapted to protect the same during brazing together of the wires, and clamping means attached to said members for holding the tire securing wires under tension.

7. As a means for attaching tires to wheel fellies, a member having separated abutments for the ends of the rubber tire, and having portions engaging the sides of the felly and adapted to protect the same during brazing, and a pair of clamping members carried by said first-mentioned member and having bearings respectively against said separated abutments.

In testimony whereof I affix my signature in presence of two witnesses.

HENRY L. STOUP.

Witnesses:
  ORSON PEPPER,
  FLOYD E. DAGGETT.